Patented Dec. 29, 1925.

1,567,755

UNITED STATES PATENT OFFICE.

FRIEDRICH RÜSBERG, OF MANNHEIM, GERMANY, ASSIGNOR TO THE FIRM RHENANIA VEREIN CHEMISCHER FABRIKEN A. G., OF COLOGNE, GERMANY.

PROCESS FOR OBTAINING ALKALI-METAL THIOSULPHATE FROM SOLUTIONS CONTAINING ALKALI-METAL SULPHIDE.

No Drawing. Application filed May 28, 1925. Serial No. 33,492.

*To all whom it may concern:*

Be it known that I, FRIEDRICH RÜSBERG, a German citizen, residing at Mannheim, Germany, have invented certain new and useful Improvements in Processes for Obtaining Alkali-Metal Thiosulphate from Solutions Containing Alkali-Metal Sulphide, of which the following is a specification.

A corresponding application for Letters Patent was filed in Germany on October 19, 1921.

Sodium thiosulphate is nowadays frequently obtained from sodium sulphide or from solutions of the manufacture of sodium sulphide by treatment with furnace gases. One drawback of the process consists therein that the waste gases of this process regularly contain hydrogen sulphide in amounts of about one per cent by volume and more.

Apart from the fact that the waste gases containing hydrogen sulphide lead to a contamination of the environs, considerable amounts of sulphide are furthermore lost in this manner.

It has now been found, that it is possible greatly to reduce the formation of hydrogen sulphide or even to avoid such formation altogether, if one employs the sulphurous acid required for sulphurizing the solution of sodium suphide not in form of furnace gases but in a form as undiluted by other gases as possible, be it in form of highly concentrated or pure gases of sulphurous acid as are obtained in many technical processes or be it in form of an aqueous solution. The reaction then ensues along with precipitation of sulphur, whereas the concentration of the hydrogen sulphide in the waste gases keeps on getting less and less with increasing concentration of the gases containing sulphur dioxide. In employing pure gases of sulphurous acid as well as sulphurous acid in solution no hydrogen sulphide whatever is formed. The reaction may be represented by this working method by means of the following equation:

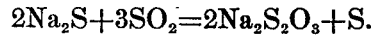

Seeing that the precipitated sulphur in statu nascendi exists in the condition of extremely fine division it is possible to convert it quantitatively into alkali metal thiosulphate presuming one provides for the simultaneous presence of alkali metal sulphite or other substances e. g. soda $Na_2CO_3$, that are capable of forming alkali metal sulphite. In this case the reaction is marked by the following equation:

In place of alkali metal sulphite, alkali metal bisulphite may also be used.

*Examples.*

1. A mother liquor or lye containing 540 g. $Na_2S.9H_2O$ per litre is treated with sulphurous acid in the usual manner, one half of its volume of a saturated solution of sodium sulphite being added simultaneously. The gas employed contains 32 per cent by volume of $SO_2$. An almost quantitive reaction results.

2. A solution containing 540 g. $Na_2S.9H_2O$ per litre is mixed with half its volume of a solution of soda ($Na_2CO_3$) containing 160 g. $Na_2CO_3$ per litre; whereupon this mixture is treated with a gas containing 32 per cent by volume of $SO_2$. One obtains a solution of sodium thiosulphate containing 490 g. $Na_2S_2O_3.5H_2O$ per litre and only a trace of sulphite.

3. 1000 litres of a solution containing 480 g. $Na_2S.9H_2O$ per litre are mixed with 630 litres of a solution of sodium sulphite, containing 200 g. $Na_2SO_3$ per litre, whereupon concentrated sulphurous acid is added. The sulphurous acid is completely absorbed. As soon as the solution gives a neutral reaction with litmus paper the reaction is finished.

4. 1000 litres of a concentrated solution of sodium sulphide containing 800 g. of $Na_2S.9H_2O$ per litre are mixed with 610 litres of a solution of sodium bisulphite containing 566 g. $NaHSO_3$ per litre and 2520 litres of an aqueous solution of sulphurous acid. No hydrogen sulphide is formed, nor is any sulphur precipitated. The solution of sodium thiosulphate obtained contains 320 g. of $Na_2S_2O_3.5H_2O$ per litre.

What I claim and desire to secure by Letters Patent of the United States is:

The process of obtaining sodium thiosulphate from solutions containing sodium sulphide, which consists in treating said solutions, in the presence of sodium sulphite, with a gas containing thirty-two percent by volume of sulphur dioxide.

FRIEDRICH RÜSBERG.